(No Model.) 2 Sheets—Sheet 1.
J. R. WHERRY & H. H. ROTTAKEN.
REGISTERING FAUCET.
No. 386,419. Patented July 17, 1888.
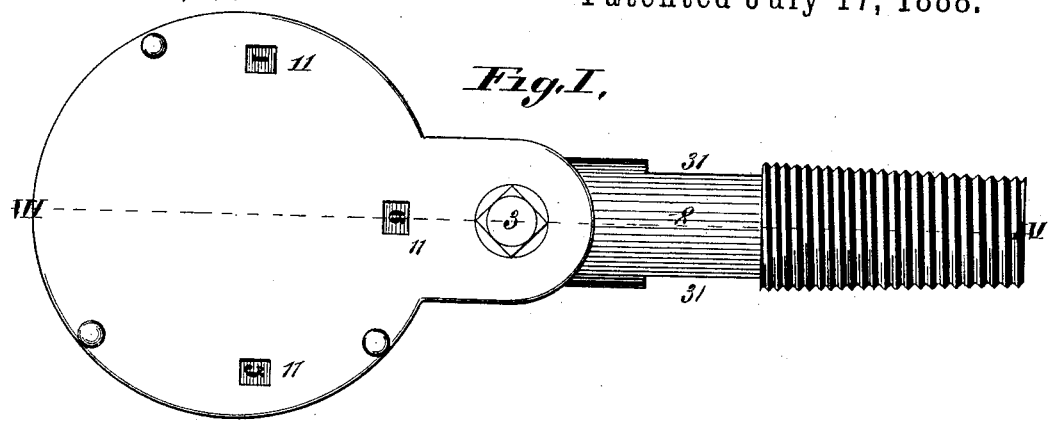
Fig. I.
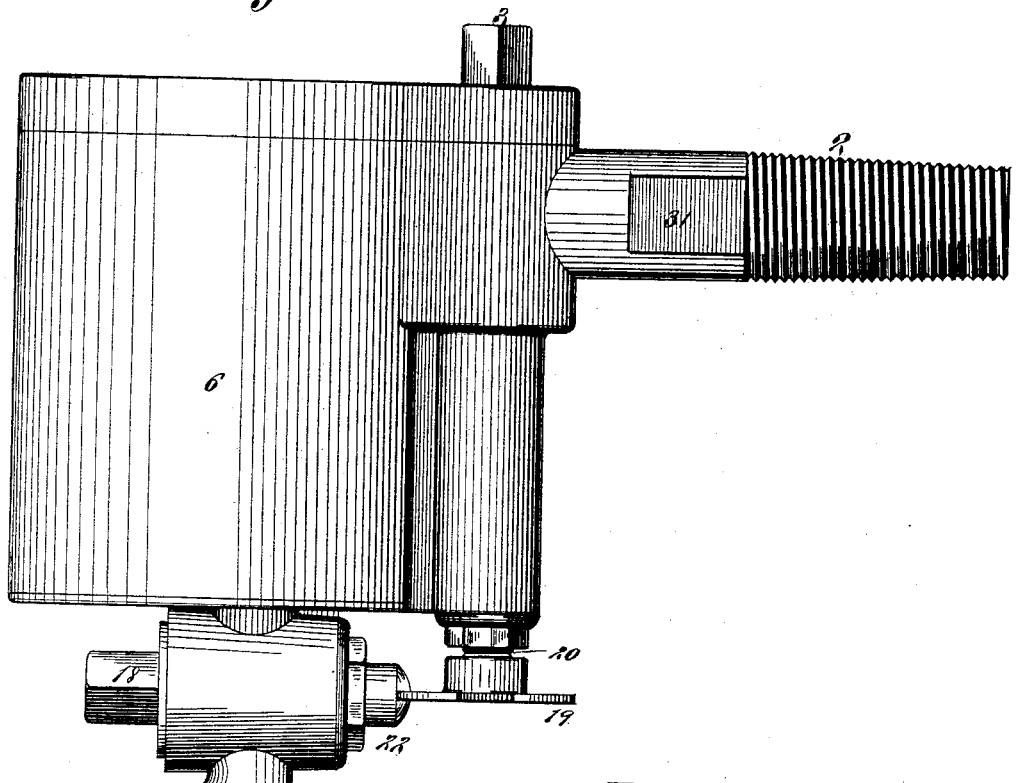
Fig. II.
Attest:
Chas Pickles,
Emma Arthur.
Inventor:
Jno R. Wherry.
H. H. Rottaken.
By Knight Bros.
att'ys

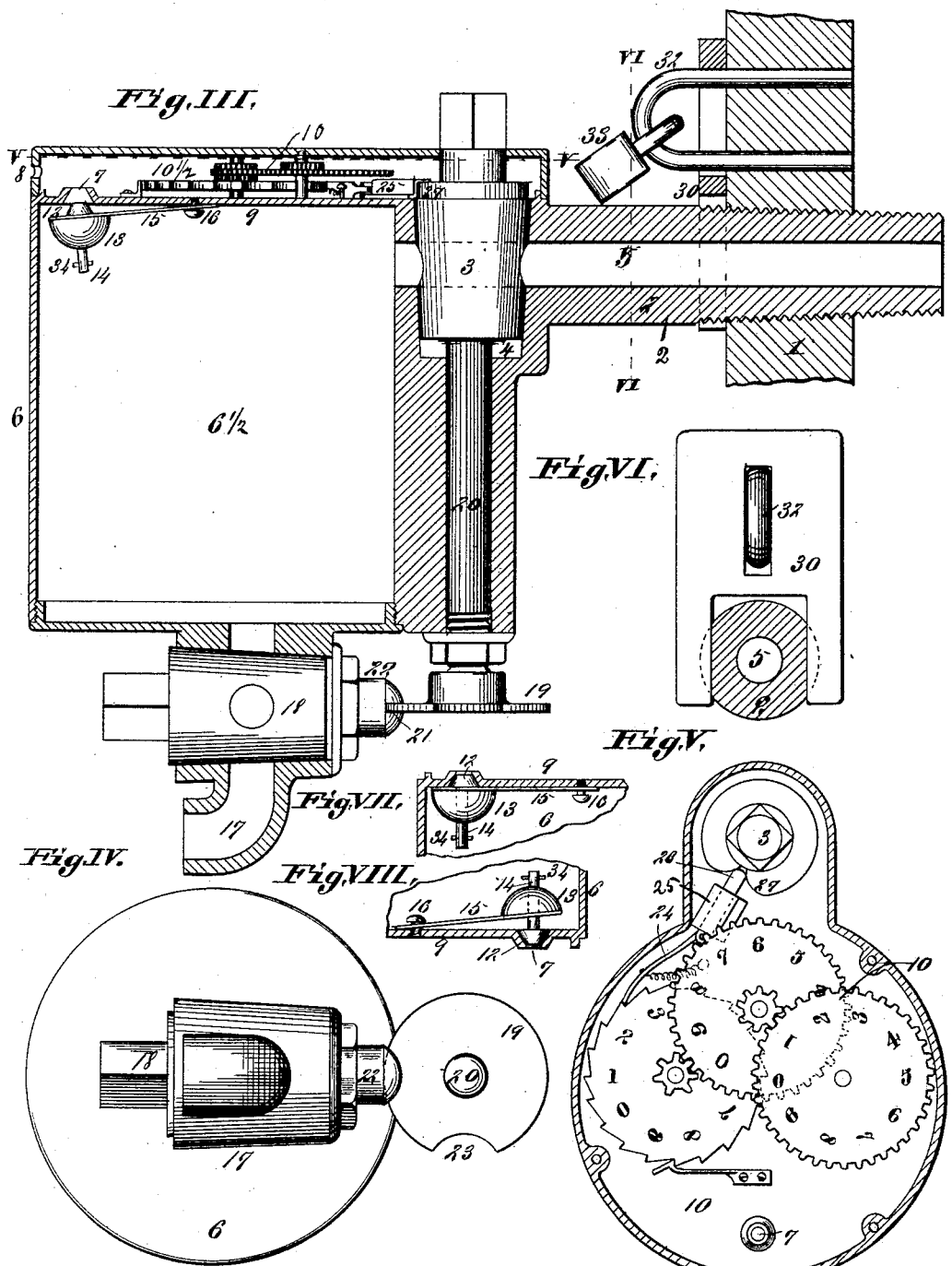

UNITED STATES PATENT OFFICE.

JOHN R. WHERRY AND HERBERT H. ROTTAKEN, OF LITTLE ROCK, ARKANSAS, ASSIGNORS, BY DIRECT AND MESNE ASSIGNMENTS, OF ONE-HALF TO DEAN ADAMS, OF SAME PLACE, AND HENRY SCHMASEN, OF ST. LOUIS, MISSOURI.

REGISTERING-FAUCET.

SPECIFICATION forming part of Letters Patent No. 386,419, dated July 17, 1888.

Application filed August 11, 1887. Serial No. 246,707. (No model.)

*To all whom it may concern:*

Be it known that we, JOHN R. WHERRY and HERBERT H. ROTTAKEN, both of Little Rock, in the county of Pulaski and State of Arkansas, have invented a certain new and useful Improvement in Registering-Faucets, of which the following is a full, clear, and exact description, reference being had to the accompanying drawings, forming part of this specification, in which—

Figure I is a top or plan view of our improved faucet. Fig. II is a side elevation. Fig. III is a longitudinal section taken on line III III, Fig. I. Fig. IV is a bottom view. Fig. V is a section taken through the register on line V V, Fig. III. Fig. VI is a section taken on line VI VI, Fig. III. Fig. VII is a detail side view of the check-valve and float, showing them closed. Fig. VIII is a similar view showing the parts inverted, the valve closed and the float open.

Our invention relates to certain improvements in self-registering faucets; and it consists in features of novelty hereinafter fully described, and pointed out in the claims.

Referring to the drawings, 1 represents part of a keg, barrel, or other receptacle from which liquid is taken.

2 represents a hollow stem or spigot of the faucet, which is screwed or otherwise fastened in the keg or barrel 1.

3 represents a turning plug located in a chamber, 4, on the outer end of the stem 2, the plug serving to open and close the passage or opening 5 of the stem 2.

6 represents a shell provided with a chamber, 6½, on the outer end of the stem 2, and in which the liquid enters from the stem when the plug 3 is opened. This chamber contains a given amount of liquid, which of course is known to the proprietor. As the chamber is being filled, the air escapes through an opening, 7, and a vent, 8, the opening 7 being made in a partition, 9, at the upper end of the chamber 6½, the partition forming a space, 10½, between it and the top of the shell, in which is located a register, 10, of any approved form, consisting, preferably, of disks carrying numerals, which are exhibited through openings 11 in the top of the shell 6. (See Fig. I.) When the chamber 6½ is filled, the opening 7 is closed by a valve, 12, seating in it, and which is forced to its closed position by means of a float, 13, on the stem 14 of the valve. The valve and float are connected by a flexible spring, 15, to the partition 9, as shown at 16. As soon as the chamber is filled, and before any liquid can be removed therefrom, the plug 3 is closed. The liquid is removed from the chamber 6½ through a nozzle, 17, provided with a turning plug, 18, and to prevent the latter, 18, from being opened until the plug 3 is closed we form a disk, 19, on the lower end of a stem, 20, on the plug 3. This disk (when the plug 3 is opened) engages a slot, 21, in the extended end 22 of the plug 18, as shown in Figs. III and IV, the disk being shown in Fig. IV in the position it would be in when the plug 3 is opened. It will thus be seen that so long as the plug 3 is opened the plug 18 cannot be opened, and, as the disk has to match with the slot 21 in the plug 18, neither can the plug 3 be opened without first closing the plug 18, so that liquid cannot be allowed to run through both plugs at the same time. When the plug 3 is closed, a notch, 23, in the disk 19 comes opposite the end 22 of the plug 18, and the latter, 18, may then be opened, and this takes place (as stated) when the plug 3 is closed. Each time the plug 3 is opened the register is operated, thus indicating the number of times the chamber 6½ has been filled.

The register is moved or operated, through means of the plug 3, by a pawl or arm, 24, supported in a bracket, 25, and having an inner end, 26, against which a cam, 27, on the plug 3 bears. It will thus be seen that when the plug is turned to open it the pawl or arm will be forced forward, moving the disks to indicate that the plug has been opened.

This device is well suited for drawing liquors and wines from kegs or barrels as a means of ascertaining the amount of liquid taken from the receptacle.

To avoid the entire faucet being taken out of the receptacle and the liquors removed through the spigot-hole, we provide a hasp or bifurcated plate, 30, the forks of which fit in notches 31 (see Figs. I, II, and III) of the stem 2, and which may be held in place by a staple, 32, and lock 33.

To cut off an attempt to remove the liquid through the opening 7 and vent 8, we elongate the stem 14 of the valve 12, as shown in Figs. III, VII, and VIII, and allow the stem to move freely in the float, it being held from entire disengagement by a cross-pin, 34. When the barrel or keg is turned to allow the liquid to drain out through the holes 7 and 8, the valve will close by gravity, as shown in Fig. VIII, while the float may remain in its normal position.

Fig. VII shows the float and valve closed by the pressure of the liquid when the chamber $6\frac{1}{2}$ is filled, as already stated.

We claim as our invention—

1. The combination, with the plugs 3 and 18 and a shell having a chamber located between the plugs, of a register with which one of the plugs is connected to indicate the number of times such plug is opened, and a locking device connecting the plugs, substantially as and for the purpose set forth.

2. The combination of the stem or spigot 2, plug 3, having stem 20, register connected with said plug, locking-disk on the lower end of said stem, having a notch, 23, plug 18, having a slot, 21, with which said disk engages, the shell 6, having a chamber, $6\frac{1}{2}$, and valve 12, substantially as and for the purpose set forth.

3. The combination of the stem or spigot 2, having notches 31, hasp 30, staple 32, lock 33, plug 3, register 10, to which said plug is connected, stem 20 on the plug, notched disk 19, plug 18, with which the disk engages, and the shell 6, having a chamber, $6\frac{1}{2}$, substantially as and for the purpose set forth.

4. The combination of the stem or spigot 2, plug 3, plug 18, having a slot, 21, the locking-disk 19, having a notch, 23, by which the plugs are connected, the shell 6, having a chamber, $6\frac{1}{2}$, and valve for allowing admission of air into the chamber, substantially as and for the purpose set forth.

5. The combination of the stem or spigot 2, plug 3, plug 18, to which the plug 3 is connected, the shell 6, having a chamber, $6\frac{1}{2}$, valve 12, having elongated stem, and float 13, substantially as and for the purpose set forth.

6. The combination of the stem or spigot 2, plug 3, plug 18, locked to the plug 3, the shell 6, having a chamber, $6\frac{1}{2}$, register 10, pawl 24 26, and a cam, 27, on the plug 3, substantially as and for the purpose set forth.

7. The combination of a plug having a disk, 19, formed with a notch, 23, a plug having a slot, 21, in which the disk rotates, and a shell having a chamber between the plugs, substantially as described.

JOHN R. WHERRY.
HERBERT H. ROTTAKEN.

In presence of—
CHAS. H. SCHUSSLER,
A. GALLAGHER.